United States Patent [19]

Bunch et al.

[11] Patent Number: 4,638,766

[45] Date of Patent: Jan. 27, 1987

[54] PROCESS FOR THE TREATMENT OF BOILER CONDENSATE

[75] Inventors: Graham Bunch, Aldershot; Richard G. Dawes, Cove, both of England

[73] Assignee: The British Petroleum Company p.l.c., London, England

[21] Appl. No.: 834,954

[22] Filed: Feb. 28, 1986

[30] Foreign Application Priority Data

Mar. 7, 1985 [GB] United Kingdom ................. 8505870

[51] Int. Cl.⁴ ......................... F22B 37/48; F22D 5/00
[52] U.S. Cl. .................................... 122/398; 122/397; 210/321.1; 210/433.2; 210/652
[58] Field of Search ................. 122/397, 398, 91, 202; 210/652, 321.1, 433.2

[56] References Cited

U.S. PATENT DOCUMENTS

| | | | |
|---|---|---|---|
| 982,107 | 1/1911 | Wiemann | 122/398 |
| 1,895,635 | 1/1933 | McDonald | 122/398 |
| 3,632,505 | 1/1972 | Nelson | 210/652 |
| 4,414,113 | 11/1983 | Laterra | 210/652 X |

OTHER PUBLICATIONS

*Ultrafiltration Saves Oil, Cleans Waste;* Iron and Steel International, Dec. 1979, vol. 52, No. 6.

Primary Examiner—Edward G. Favors
Attorney, Agent, or Firm—Morgan & Finnegan

[57] ABSTRACT

Boiler feed water is prepared from boiler condensate by first removing insoluble oil and then feeding the condensate to one side of a reverse osmosis membrane and feeding the water from the low pressure side of the membrane to a boiler.

4 Claims, No Drawings

PROCESS FOR THE TREATMENT OF BOILER CONDENSATE

The present invention relates to the treatment of condensate water from steam boilers.

Large boilers for the production of steam for example for driving electricity generating equipment require very high quality feed water. It is usual to eliminate dissolved salts so as to prevent deposition of scale on the boiler heat exchange surfaces. The feed water is converted to steam and then subsequently condensed. This condensate is still pure in the sense that it does not contain dissolved salts. However it is often contaminated with traces of oil, e.g. lubricating oil from bearings. It would be desirable to re-use this condensed water in order to save the costs of removing dissolved salts from fresh water feed and the energy costs of heating the fresh make up water. However if water fed to a steam boiler contains oil, a film of oil will be formed on the heat exchange surfaces of the boiler. Particularly with modern boilers operated under severe conditions, this oil film can cause overheating and stress corrosion of the heat exchange surfaces. In addition suspended solids can be bound together to form agglomerates which can result in blockage or failure of boiler tubes.

Oil in boiler condensate is of two types namely insoluble oil and soluble oil. Insoluble oil is oil in the form of discrete droplets suspended in the water. This is the major proportion of the oil. Much of this can be removed by filtration or coalescence. However the condensate also contains dissolved oil which is much more difficult to remove. A typical specification for the oil content of boiler feed water is that the oil content shall be less than 1 mg/litre. However dissolved oil contents of boiler condensate water can often be in the range 3 to 5 mg/l. It is therefore necessary to remove the dissolved oil if the condensate water is to be recycled to the boiler.

It is possible to use beds containing carbon or adsorbent to remove the dissolved oil. However, we have found that these methods of treatment are not very effective in obtaining low levels of soluble oil and require frequent regeneration. If the treatment process is not closely monitored there is a risk that the bed will become overloaded and oil will break through into the boiler feed water, with consequent adverse effects on the boiler. There is also a problem with the insoluble oil. Although the bulk of the oil can be removed before the water is fed to the bed of carbon or adsorbent resin, a small quantity of insoluble oil may pass through into the bed and will tend to clog the bed so reducing the throughput of water.

At present, because of the problems of removing oil indicated above, boiler condensate is often discarded with consequent economic loss.

The use of membranes to treat effluents containing oil has been proposed, e.g. in Chemical Engineering, 11 June 1984, p 87. However these membranes are ultrafiltration membranes containing a large number of very fine pores and they are used to remove insoluble oil e.g. from effluents from cutting fluids. Such membranes will not be suitable for the treatment of boiler condensate for reuse as boiler feed because of the exceptionally high level of oil removal required, and in particular the requirement to remove the soluble oil which will not be removed by ultrafiltration.

Thus an article on Ultrafiltration in Chemical Engineering, May 8th, 1978, pages 168–169 explains that ultrafiltration may be used to recover oil from oil-water emulsions. However there is still the risk that soluble oil will pass through the pores of the untrafiltration membrane.

It has been proposed to use membranes having a continuous surface layer to desalinate water by the process of reverse osmosis in which a pressure gradient is used to separate water from a saline solution by forcing water from the saline solution through the membrane.

Thus, J. P. Leger, Water SA, Vol 10, No. 3, July 1984, p 147 mentions the use of reverse osmosis membranes for various purposes including the preparation of feed to high pressure boilers. However, the membrane is here used to prepare the initial demineralised feed water. Boiler feed condensate is of course already demineralised.

An article on reverse osmosis in Chemical Engineering, June 11th, 1984 refers on page 73 to the ability of reverse osmosis membranes to remove high molecular weight organics. However, the article explains on page 74 that all reverse osmosis membranes are severely affected by oil and grease, which would not encourage their use in treating oil-contaminated water.

According to the present invention the process for preparing boiler feed water comprises subjecting a boiler condensate to a step of removing insoluble oil, and then passing the condensate under elevated pressure into contact with one side of a reverse osmosis membrane, the other side of which is maintained at a lower pressure, recovering purified water from said other side of the membrane, and recycling the purified water to the boiler as feed.

The bulk of the dissolved oil is aromatic material and the molecule is relatively small and compact in relation to its molecular weight. Nevertheless adequate separation is obtained by using a reverse osmosis membrane. Further although the membrane's surface is continuous it is less affected by minor quantities of insoluble oil than the beds of particulate material mentioned above, even though it seems reasonable to expect that a bed of particles with numerous interstices will be better able to resist minor amounts of fouling than a continuous surface such as a membrane.

If a major quantity of insoluble oil passes through the insoluble oil separation step, the process of the present invention will protect the boiler from the destructive effects of oil, and the membrane can be readily cleaned later (although at the price of certain loss of effectiveness).

The boiler condensate before being fed to the insoluble oil removal step will typically have a total oil content in the range 5 to 60 mg/l. The means for removing the insoluble oil may for example be a suitable filter or coalescing device. These are commercially available.

Reverse osmosis membranes as used in the process of the present invention are well known commercially available materials. An example of the suitable commercially available material is that supplied by Patterson Candy International under the designation ZF99. This membrane is believed to be a non-cellulose acetate membrane on a polysulphone support. More particularly, this membrane is believed to be made in accordance with European patent specification No. 15149, and to consist of a condensation product of a cross-linked, interfacially polymerised ultra thin polyamide layer on a support which is a polysulphone porous membrane. The polyamide layer is made by reacting m-phenylene diamine with trimesoyl chloride.

The reverse osmosis membrane used must of course be resistant to the condensate at the temperature at which the condensate is brought into contact with the membrane. As, for reasons of energy economy, the condensate is preferably at a temperature in the range 60°-90° C., more preferably 70°-80° C., when it is brought into contact with the membrane, the membrane is preferably resistant to these temperatures.

The membrane separation unit is preferably operated at high flow rates corresponding to high Reynolds numbers in the range 5-20,000. For this reason spirally wound or hollow fibre membranes which may not have adequate strength, are best avoided. Also such small diameter units limit the Reynolds number obtainable.

Apparatus suitable for using such membranes is well-known. The membranes are often supplied in the form of tubes, with built in reinforcement, through which the liquid to be treated is passed. A plurality of such tubes may be connected in series and/or parallel in a vessel from which the purified water is removed.

The pressure differential applied across the membrane may vary over moderately wide range for example from 30 to 60 bar (3 to 6 MPa).

The process is preferably carried out at moderately elevated temperature to minimise energy losses due to cooling of the condensate, for example in the range 60° to 80° C.

The invention will now be illustrated by reference to the following specific embodiment.

The membrane separation unit was a commercially available module marketed by Paterson Candy International Limited under the designation B1. The module was a pressure tight vessel 1.2 m long and contained two tubular membranes (sold as ZF99 membranes) arranged side by side in the module but connected in series so that liquid was fed into and recovered from the tube at the same end of the module. The working area of the membrane was 0.1 m².

Permeate was recovered from the module at the end remote from the feed inlet and outlet.

In experiments carried out at pressures applied to the liquid feed of 40 to 70 bar with an aqueous feed corresponding to a boiler condensate and containing up to 40 mg/l of soluble oil the content of soluble oil in the permeate was at the limit of detection (less than 1 mg/l).

The rate of flow of permeate in litres/sq. metre of membrane/hour depends on the crossflow rate of fluid over the membrane surface, operating pressure, and insoluble oil content in the feed. Permeate rates of 32 l/m²/hr have been obtained under typical conditions. Reasonable permeate rates have been observed with insoluble oil contents up to 15 mg/l.

The above experiment was carried out with a feed containing only soluble oil. In practice insoluble oil would also be present and means would be provided to remove such oil. This can be done by various known techniques. Thus cartridge filters, sand filters, and gravity separation can be used. As these techniques are known they are not described here in detail.

We claim:

1. The process for preparing boiler feed water which comprises subjecting a boiler condensate to a step of removing insoluble oil, and then passing the condensate under elevated pressure into contact with one side of a reverse osmosis membranes the other side of which is maintained at a lower pressure, recovering purified water from said other side of the membrane, and recycling the purified water to the boiler feed.

2. The process according to claim 1 wherein the membrane is a polyamide layer deposited on a polysulphone support.

3. The process according to claim 1 wherein the pressure differential across the membrane is 3 to 6 MPa.

4. The process according to claim 1 wherein the process is carried out at a temperature of 60° to 80° C.

* * * * *